Feb. 28, 1939. H. O. HAFERKORN 2,149,248
AUTOMOBILE JACK
Original Filed May 16, 1935

Inventor
Herbert O. Haferkorn
By Mast and Bishop
Attorneys

PUSHING & PULLING IMPLEMENTS.

Patented Feb. 28, 1939

2,149,248

UNITED STATES PATENT OFFICE 2,149,248

AUTOMOBILE JACK

Herbert O. Haferkorn, Alliance, Ohio

Refiled for abandoned application Serial No. 21,824, May 16, 1935. This application January 8, 1937, Serial No. 119,691

3 Claims. (Cl. 254—100)

The invention relates generally to jacks, and more particularly to automobile jacks adapted to engage under the front or the rear bumper or other outer portion of an automobile for raising one end thereof; and this application is a substitute for an application Serial No. 21,824, filed by me as Herbert O. Haferkorn on or about May 16, 1935, and abandoned on or about January 29, 1936.

Until recently, prior automobile jacks have been adapted to engage under the axle or one of the car suspending springs, which consequently requires pushing the jack a considerable distance under the overhanging portions of the vehicle. This operation is dirty and disagreeable, as well as somewhat difficult, especially in the case of the more modern types of automobiles because of their low wheel suspensions and overhanging bodies, and also because of their balloon tires, which when deflated, drop the car body very closely to the ground.

These objectionable features and difficulties have created considerable demand for a jack which will raise the desired portion of the automobile by engaging under the outermost portions thereof, preferably, the front or rear bumper, so that the operator is not required to push the jack under the car body.

Certain prior constructions of this latter type of jack, which may be referred to as a bumper jack, have been objectionable in that it is difficult to properly position the load engaging member of the jack in lifting engagement with the bumper.

In other prior constructions the bumper engaging member is free to slide or shift laterally on the bumper as the same is being lifted, which movement tends to kick out or disengage the jack due to any change in angularity of the bumper which occurs during the lifting movement.

Another disadvantage with certain prior bumper jacks is that the manipulating handle is connected directly with the load engaging member of the jack, requiring the operator to stoop and operate the handle close to the ground during the first part of the lifting operation.

It is therefore an object of the present invention to provide an improved jack which is easily positioned in lifting engagement with the bumper or other outer portion of an automobile.

Another object is to provide an improved jack which is adapted to be automatically clamped onto the bumper as the load is imposed on the jack, thus preventing any lateral relative movement between the bumper and the jack.

A further object is to provide an improved bumper jack which is always easily operated at the top thereof, regardless of the position of the bumper, so as to obviate any necessity for stooping by the operator in operating the jack.

A still further object is to embody all of the foregoing advantageous features in a simple and inexpensive construction which is relatively light in weight and easily and effectively operated.

These and other objects are attained by the improvements comprising the present invention, which may be stated in general terms as including a base, an upright screw swiveled at its lower end in the base, a nut member on the screw, lifting means mounted on the nut for engaging under a bumper and adapted to automatically clamp the bumper against the nut member when the load is lifted, and means at the upper end of the screw for rotating the same.

In the drawing forming part hereof

Similar numerals refer to similar parts throughout the several views of the drawing.

Figure 1:
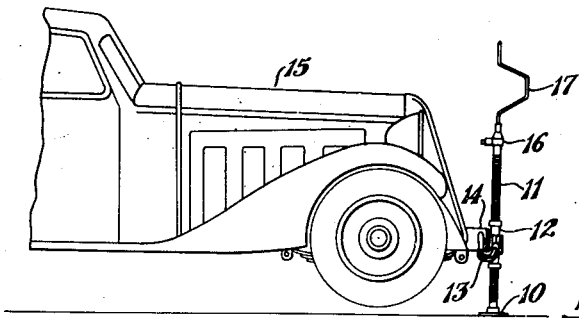
Figure 1 is a general view of a portion of an automobile, showing the front bumper thereof engaged by my improved jack for lifting the front end of the automobile.

The improved jack as shown in Fig. 1 preferably includes a base 10 and an upright screw 11 swiveled at its lower end therein. The screw 11 is preferably swiveled in the base 10 in a well known manner to be capable of considerable tilting movement about the base, so as to provide for jacking up an automobile on sloping or uneven ground.

A nut member 12 is threaded on the screw 11, and load lifting and clamping means in the form of a hook indicated generally at 13 is movably connected with the nut 12 for engaging under and clamping the bumper bar 14 of an automobile indicated generally at 15.

Preferably, ratchet means 16 is mounted on the upper end of the screw 11 and a handle 17 is detachably connected thereto for rotating the screw 11 in the base.

The nut member 12 is preferably somewhat elongated as shown, and is provided with an axial bore 18 through which the screw 11 passes. At each end of the nut 12 the bore 18 is of such diameter to fit closely around the threads of screw 11, as shown at 19, for providing spaced supporting bearings for the nut. At its longitudinally central portion the nut 12 is preferably provided with an enlarged internally threaded portion 20 which is screwed on the screw 11.

At laterally opposite sides, the enlarged portion 20 of the nut is flattened as shown at 21, and provided with angular slots 22. The slots 22 are in planes parallel with the longitudinal axis of the screw 11, but are disposed at an acute angle to said axis for a purpose to be hereinafter described.

Between the flattened sides 21, the enlarged portion 20 of the nut is provided with a relatively wide substantially flat surface or side 23 having at its laterally opposite edges longitudinally extending ribs 24, and these ribs 24 provide space abutments for abutting a bumper bar or other outer member of the load to be lifted.

The improved load engaging and clamping means preferably includes the hook shaped member indicated generally at 13 having the upwardly extending portion 25 for surrounding a bumper bar 14, and the portion 25 preferably has a boss or other protuberance 25a for abutting the bumper bar 14 at a point between the ribs 24 providing abutments on the nut 12.

Figure 2:
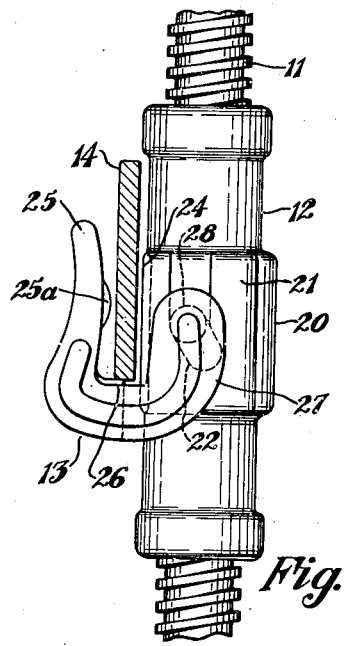
Fig. 2 is an enlarged fragmentary view of the improved jack, showing a bumper bar being engaged by the lifting and clamping means before the bumper bar is automatically clamped by the load.

An intermediate load engaging portion 26 extends angularly from the lower end of portion 25 for engaging and supporting a load member or the bumper bar 14, as shown in Fig. 2.

Spaced arms 27 preferably extend rearwardly and upwardly from the load engaging portion 26 for slidably contacting the flattened sides 21 of the enlarged portion of the nut. At their inner ends the arms 27 are preferably provided with studs or pivots 28 which are pivotally and slidably inserted in the angular slots 22 for movably connecting the hook 13 to the nut 12.

The means for rotating the screw 11 is preferably connected to the upper end thereof, and may include the ratchet member indicated generally at 16 having the squared socket 30 for detachably receiving the squared end 31 of the crank handle 17. The ratchet 16 is releasably connected to the upper end of the screw 11 by means of a spring pressed pawl 32 urged inwardly by the spring 33, and having the beveled end 34 for entering one of the circumferentially arranged notches 35 in the screw 11, in a usual and well known manner.

Figures 6, 7:
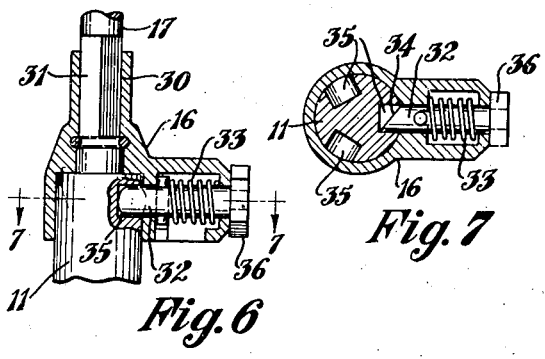
Fig. 6 is a fragmentary sectional view showing a preferred form of operating means at the top of the screw.
Fig. 7 is a transverse sectional view taken on line 7—7, Fig. 6.

By rotating the handle 17 in a clockwise direction as viewed in Fig. 7 the pawl 32 will rotate the screw, and rotation in a counterclockwise direction will allow the pawl to ratchet past the notches 35. The pawl 32 is preferably provided with a finger engaging portion 36 by means of which the pawl may be pulled outwardly against the spring 33 and axially rotated 180°, in order that the ratchet will rotate the screw 11 in the opposite direction.

Figure 3:
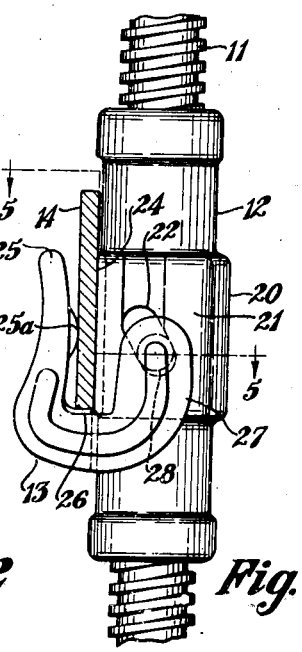
Fig. 3 is a similar view showing the bumper bar clamped between the clamping means and the nut member.
Figure 4:
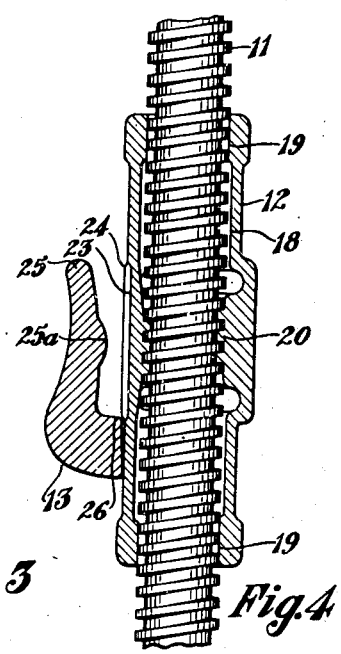
Fig. 4 is a longitudinal sectional view through the nut member, showing the bumper lifting and clamping means in normal position.
Figure 5:
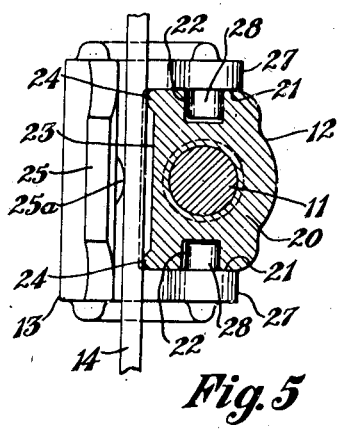
Fig. 5 is a transverse sectional view taken on line 5—5, Fig. 3.

In the operation of the improved jack, the base 10 is positioned beneath the bumper bar 14 and, by holding the nut with one hand and turning the handle 17 with the other, the nut member may then be raised until the hook 13 is in position to engage the bumper bar. The hook 13 is then moved upwardly and outwardly by sliding the pivots 28 in the angular slots 22, to the position shown in Fig. 2, so that the load supporting portion 26 of the hook engages under the bottom of the bumper bar 14. By further rotating the handle 17 to raise the nut 12, the load transmitted by the bumper bar will force the hook 13 to the position shown in Figs. 3, 4 and 5 and automatically clamp the bumper bar 14 between the portion 25 of the hook and the nut.

The bumper bar 14 will thus be clamped between the spaced abutments or ribs 24 of the nut and the boss or abutment 25a of the hook to provide a three point abutment clamping the bumper bar between the nut and the hook.

Thus, the load being raised acts to automatically clamp the bumper bar, and if there is any change in angularity of the bumper bar as it is raised, the three point abutment will permit slight lateral rocking movement of the bumper bar to compensate therefor.

When the nut member is lowered by rotating the screw in the opposite direction, as soon as the load is removed from the bumper bar the hook 13 will move to the position of Fig. 2 to unclamp the bumper bar.

Since the improved jack is always rotated or operated at the top of the screw 11, the operator does not need to stoop over to any extent during the lifting operation.

The improved jack is simple and inexpensive to construct and easily and effectively operated by any and all persons, and may be stored in a relatively small space by detaching the handle.

Since the bumper bar is automatically clamped to the jack by the load thereon, the greater the load imposed upon the jack the greater will be the clamping action on the bumper bar or other load member.

I claim:

1. In a lifting jack having an upright screw, a nut member on the screw provided with an angular slot, and a load engaging member pivotally mounted in said slot, said load engaging member being movable in said slot by lifting engagement with a load member for clamping said load member against said nut member.

2. Jack construction including a base, an upright screw swiveled in the base, a nut member threaded on the screw and provided with an angular slot, and a load supporting hook pivotally mounted in said slot, said hook being movable in said slot by lifting engagement with a member of the load for clamping said load member between said hook and said nut member.

3. Jack construction including a base, an upright screw swiveled in the base, a nut member threaded on the screw and provided with an angular slot, and a load supporting hook pivotally mounted in said slot, said hook being movable in said slot by lifting engagement with a member of the load for clamping said load member between said hook and said nut member, and said hook and said nut member having means for providing a three point clamping abutment with said load member.

HERBERT O. HAFERKORN.